United States Patent [19]

Bowen, III

[11] 4,232,914

[45] Nov. 11, 1980

[54] HOLLOW ROLLER TAPERED BEARING

[75] Inventor: Willard L. Bowen, III, Harwinton, Conn.

[73] Assignee: The Torrington Company, Torrington, Conn.

[21] Appl. No.: 15,010

[22] Filed: Feb. 26, 1979

[51] Int. Cl.³ ............................................. F16C 19/36
[52] U.S. Cl. ...................................... 308/215; 308/214
[58] Field of Search .............. 308/184 R, 184 A, 202, 308/207 A, 208, 209, 211, 214, 215, 218

[56] References Cited

U.S. PATENT DOCUMENTS

| 2,615,767 | 10/1952 | Wallgreen | 308/214 |
| 2,631,904 | 3/1953 | Frenkel | 308/214 |
| 3,948,578 | 4/1976 | Martin | 308/214 |
| 4,023,869 | 5/1977 | Caldwell | 308/214 |

Primary Examiner—Frederick R. Schmidt
Attorney, Agent, or Firm—Frank S. Troidl

[57] ABSTRACT

A plurality of hollow rollers is located in the annular space between the inner and outer tapered raceways of a tapered bearing. Each hollow roller has an axial bore extending completely therethrough. The percent hollowness of each roller is uniform throughout its full length. The rollers may be preloaded between the races.

11 Claims, 6 Drawing Figures

HOLLOW ROLLER TAPERED BEARING

This invention relates to tapered bearings. More particularly, this invention is a new hollow roller and a new hollow roller tapered bearing.

Examples of prior art tapered bearings with hollow tapered rollers are U.S. Pat. Nos. 1,049,471 granted Jan. 7, 1913, to J. F. Foster and 2,631,904 granted Mar. 17, 1953, to M. Frenkel. Prior art tapered bearings with hollow cylindrical rollers, sometimes referred to as conical bearings, are noted in U.S. Pat. No. 3,744,863 granted July 10, 1973, to Derner et al. Various configurations of hollow rollers are shown in U.S. Pat. No. 3,337,278 granted Aug. 22, 1967. This invention is a novel uniform hollowness hollow roller for a tapered bearing and a tapered bearing including that hollow roller which have several advantages when compared to the hollow rollers and roller tapered bearings of prior art.

Briefly described, this invention comprises bearing members having inner and outer tapered truncated conical raceways confronting one another to define an annular space. A plurality of hollow rollers is located in the annular space and preferably the rollers are in preloaded contact with the raceways. That is, the raceways are close enough together that the rollers are slightly resiliently radially compressed or radially defected into a slightly ovalized cross-sectional shape. Each hollow roller has an axial bore extending completely therethrough. The percent hollowness of each hollow roller is uniform throughout its full length. The percent hollowness, also called "hollowness" or "hollowness ratio", is defined as the ratio of the diameter of the bore to the outside diameter of the roller at any point along the length of the roller.

The effect of constant hollowness is to produce a roller with a constant spring rate or constant load-per-deflection (pounds per inch of roller compression) rate for each increment of roller length along the full length of the roller. The advantage of this special structure is the uniform loading of the roller against the raceways surfaces, per increment of roller length, and there will be no roller skewing moments introduced to the roller by differential roller loading. The constant spring rate throughout the roller produces this uniform roller loading per increment of roller length regardless of the amount of roller preload of compression or the amount of radial or axial external loading on the bearing, although the value of the spring rate may change slightly as the roller compression changes. Thus, when bearing components or machine structures heat up, their expansion, which changes the roller preload and resilient compression, will still result in uniform roller loading and deflection for the full length of the roller.

The percent hollowness used is so chosen as to make the rollers resilient or flexible enough to allow a desired preload or elastic compression of the rollers between the races without exceeding safe stress limits for long life while still maintaining roller strength high enough to carry the required external load on the bearing. In general, the percent hollowness of the rollers will lie in the range from 50 percent to 80 percent. My preferred hollowness range is 55 percent to 65 percent for good load-carrying capacity along with the required stiff flexibility.

The new and novel hollow roller of this invention has an annular wall which in longitudinal cross-section tapers uniformly in thickness from one end of the roller to the other end. The radially outer running or bearing surface of the roller wall may be either tapered (truncated conical) or cylindrical. However, any cylindrical roller with constant hollowness ratio will have a straight bore which has been shown in the prior art but without any realization of the beneficial effects of the constant hollowness ratio as revealed in this invention. The bore or inner surface of the annular tapered wall slopes at a constant pre-determined angle with respect to the roller axis different from the slope of the outer surface. The slopes are so chosen that the wall has such a constantly varying thickness from one end to the other that the percent hollowness is uniform for the full length of the roller. This statement of uniform hollowness intentionally disregards the slight reliefs or reduction in diameter sometimes given to the running surface of the roller near the ends of the rollers to reduce the stresses in those areas. The inner (bore) surface of the wall may also be slightly "relieved" at the ends.

No cage is required to separate and guide the rollers in my preferred bearing, even using cylindrical rollers, although a cage may be used when desired. The full complement of rollers gives the greatest load-carrying capacity and the greatest bearing stiffness, and it eliminates friction between cage and rollers and between cage and race. Preloaded rollers will act against one another intermittently to maintain running clearance therebetween. The dynamic friction forces between rollers and raceways keep the rollers radially aligned in the bearing so that the extended axis of each roller will intersect the axis of the bearing, whether the rollers be cylindrical or tapered. Cylindrical rollers are used between raceways which have the same (equal) taper or cone angles, while tapered rollers require raceways with different taper angles which converge toward their small-diameter ends.

Bearings with prior art hollow rollers of varying hollowness ratio have non-uniform loading of roller against race per increment of length of the roller. This results in unbalanced aligning moments acting against the rollers, resulting in roller skewing tendencies with subsequent generation of friction and heat and ultimately in fatique failure of the bearing. Differential expansion of bearing and machine components can increase this roller loading imbalance, with resulting even faster deterioration of the bearing.

The use of tapered roller bearings on automobile wheels is well-known. It is known that in such applications a tapered roller bearing with solid rollers cannot be set up tight (with no radial clearance) or it will overheat and the resulting thermal expansion will cause excessive loading and rapid destruction of the bearing. With the hollow roller tapered bearing of this invention, utilizing the proper roller hollowness, preloaded or not, the tapered wheel bearing is not subject to such rapid destruction for two reasons. The decrease in roller space due to heat-caused expansion can be accommodated by allowable further roller deflection or radial compression. Secondly, the hole through the roller permits better lubrication and much better cooling and it will not run as hot.

Another important use for this new tapered bearing is in machine tools including rotating spindles. High "bearing stiffness," meaning small radial movement of the inner race in relation to the outer race under external bearing load, is important in machine tool spindles because rigidity in machining operations is desirable to eliminate chatter, maintain machining dimensions, reduce tool breakage, and so forth. Conventional solid roller tapered roller bearings are still used in many such applications, but they cannot be set up tight without incurring problems similar to those of the wheel bearings. Although at first thought the hollow flexible rollers would seem to reduce bearing stiffness, actually the preloaded hollow roller tapered bearing is two to four times "stiffer" than a conventional tapered roller bearing. There is no looseness or play in the bearing, nor excessive loading as the temperature changes. A full complement (no cage) of rollers with their slight additional ovalization at the load zone helping to maintain their spacing for good lubrication of running surfaces may be used and therefore there are more rollers for carrying the loads than are available with a bearing of the same size but with a cage separating the rollers. In some bearings, a cage or retainer may be designed to be used with a full complement of rollers, with the cross bars not entering the smallest space between rollers which occurs on the plane connecting the centers of adjoining rollers. Because the rollers of a preloaded hollow roller bearing are always loaded, all the rollers work to resist radial load. As an external radial load is applied to the bearing, approximately half of the complement of rollers (180°) is subject to increased pressure which the rollers resist like stiff springs when the inner race tries to move off center. At the same time, the rollers of the opposite half of the complement of rollers release some of their spring pressure (preload) with the result of doubling the force which resists the external radial load on the bearing and radial movement of the inner race relative to the outer race.

These effects are unique to a bearing with these preloaded hollow rollers. They provide a very predictable spring rate of the bearing throughout a wide range of loads. Therefore, this type of hollow roller bearing can be constructed to accommodate the conditions of each specific bearing application. By providing the correct uniform roller hollowness and roller size which determine the individual roller stiffness and load-carrying capacity, and the optimum roller preload, the bearing will nicely fit the loading requirements of the application.

One of the main advantages of any tapered bearing with hollow flexible rollers is its ability to be highly preloaded without exceeding maximum desirable roller to race contact stresses, which cannot be done with solid rollers. This ability allows complete removal of all internal race to roller clearance in the bearing and improves bearing concentric running accuracy (decreasing shaft run-out) several times over that of a conventional bearing with solid rollers. It also has these other well-known advantages as compared to a tapered bearing having solid rollers: Weight is less, so power requirements and centrifugal forces are lower; lubrication of raceways and flanges is improved by circulation and pumping through the hollow roller, along with a greater storage capacity for lubricant; cooling is improved by circulation of air and lubricant through the roller; small inaccuracies of manufacture can be accommodated by slight deflection of the hollow roller; because the hollow rollers can flex, more of them carry the load applied to the bearing, and the maximum load on any one roller is lower than the maximum load on a solid roller; the rollers are compliant and can flex slightly under shock load to form a larger "footprint" or contact area between rollers and race and by thus distributing the load, the brinelling of the races is reduced or eliminated as the contact stress remains within acceptable bounds; a slight misalignment of the tapered races is tolerated better, again because of the flexing of the rollers; lower contact forces allow a complete oil film to be maintained between roller and race, preventing direct metal contact and thus increasing bearing life.

The invention, as well as its many advantages, will be further understood by reference to the following detailed description and drawings in which.

Figure 1:
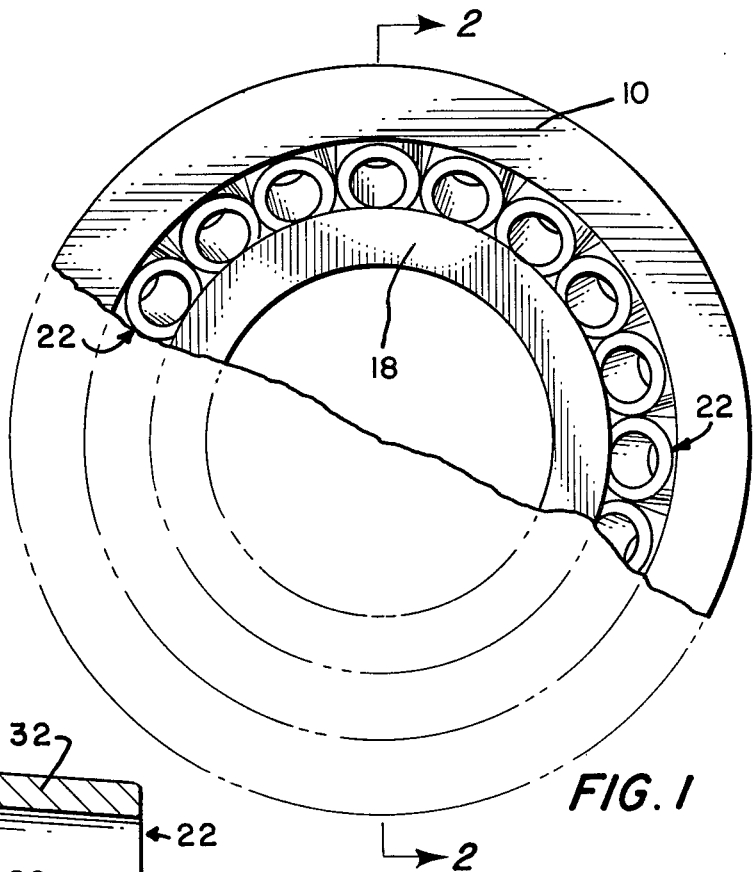
FIG. 1 is an end view of a bearing embodying my invention.
Figure 2:
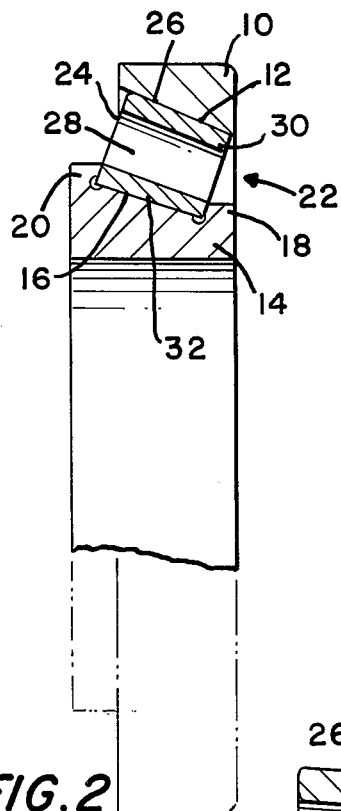
FIG. 2 is a section on line 2—2 of FIG. 1 and in the direction of the arrows.

Referring to the drawings and more particularly to FIG. 1 and FIG. 2, a tapered bearing including tapered hollow rollers is shown. The tapered hollow roller tapered bearing includes an outer member 10 having an inner tapered raceway 12, and an inner member 14 having an outer tapered raceway 16. The flanges 18 and 20 on the ends of the inner member 14 axially position the tapered hollow rollers 22. Either or each flange may help to guide the rollers, though generally the large diameter flange does the guiding and limits axial movement of the rollers.

The confronting raceways 12 and 16 define an annular space 24. A plurality of hollow tapered rollers 22 are located in the annular space 24. The tapered hollow rollers 22 may be, and preferably are, in preloaded contact with the raceways 12 and 16. The races may be maintained in their preloading positions by machine elements.

The tapered hollow roller 22 has a sloping or conical outer surface 26. An axial bore 28 extending entirely through the tapered hollow roller 22 is formed by the inside surface 30 of annular wall 32 and is also a sloping or conical surface. The confronting raceways 12 and 16 are tapered in a non-parallel converging relationship with their included angle between races as shown in section in FIG. 2 conforming to the included angle of the tapered rollers 22 as shown in section in FIG. 3.

Figure 3:
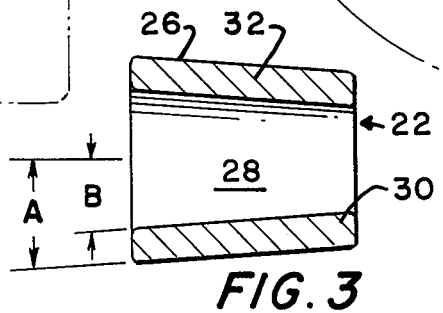
FIG. 3 is an enlarged sectional view showing the structure of the roller used in the embodiment of FIG. 1 and FIG. 2.

As shown in FIG. 3, the tapered hollow roller 22 is formed by the annular wall 32 having the outer surface 26 and the inner surface 30. The outer surface 26 of the annular wall 32 slopes at a predetermined angle "A" with respect to the roller axis. The slope of the inner surface 30 is at a predetermined angle "B" with respect to the roller axis. However, the slope of the outer surface 26 is different from the slope of the inner surface 30. The wall 32 has a constantly varying thickness from one end to the other so that the percent hollowness of the tapered roller is kept uniform for the full length of the annular wall 32, exclusive of any "end relief". For example, in a hollow roller of, say, a length of 1.125 inches and a major outer diameter of 0.9375 inches and a major inner diameter of 0.5625 inches, the angle "A"

may be 3° 20' and the angle B may be 2°. This will provide a tapered hollow roller with a percent hollowness of 60 percent throughout the full length of the roller, which means the bore diameter is 60 percent of the outside diameter at all transverse planes along the length. The percent hollowness may lie in the range from 50 percent to 80 percent and preferably from 55 percent to 65 percent to give good load-carrying capacity but also sufficient resiliency. The greater hollowness will allow greater compression without exceeding acceptable stress limits but with lower capacity to carry external loads. The lesser hollowness increases load-carrying capacity but is less tolerant of relative race position and roller compression.

Figure 4:
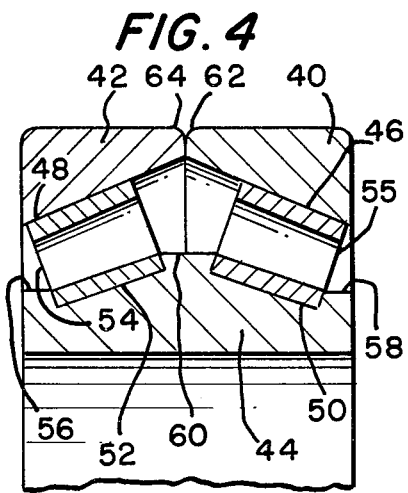
FIG. 4 is a sectional view of an embodiment of the invention including two sets of tapered hollow rollers to provide thrust capacity in both directions.

FIG. 4 shows a tapered bearing with tapered hollow rollers which is constructed to provide thrust capacity in both axial directions. The bearing includes outer raceway means comprising outer adjacent races 40 and 42 and inner raceway means comprising a single race 44. Alternatively, the inner raceway means could comprise two races back to back. Tapered raceway 46 on outer race 40 and tapered raceway 48 on outer race 42 are in confronting relationship with raceway 50 and raceway 52 respectively, on inner race 44. A first set of hollow tapered roller 54 is in the annular space defined by confronting raceways 48 and 52 and preferably will be preloaded between the raceways. A second set of tapered hollow rollers 55 is in the annular space defined by raceways 46 and 50 and will be preloaded if rollers 54 are preloaded. The slopes of the raceways 46 and 50 converge in the opposite axial direction from the converging of the raceways 48 and 52. The inner race 44 has end flanges 56 amd 58 and a central annular shoulder 60. Flange 56 and annular shoulder 60 axially position rollers 54 and shoulder 60 helps to guide the rollers 54 and limit their axial movement. Flange 58 and annular shoulder 60 axially position rollers 55 and shoulder 60 helps to guide rollers 55. Tapered rollers in tapered bearings usually bear against the large diameter shoulder or flange on the race. Instead of inner race flanges and shoulder, the outer races may alternatively have two flanges each, or there may be a combination of flanges and shoulders on the inner and outer races.

For a particular application preload is built into the bearing by grinding one or both of the mating faces 62 and 64 so that the outer raceways can be moved toward each other to compress the rollers a calculated amount as determined by the load, speed, and other requirements of the bearing application. The outer races may thereafter be welded or otherwise bonded or attached together if desired, to maintain the preload. They may also merely be contained in position by machine elements. The inner race is maintained in position relative to the outer race by the rollers.

In the bearing of FIG. 4, the two centerlines of the roller pressures perpendicular to the raceways converge toward the bearing center. The purpose is to allow for shaft sloping slightly in the bearing without overloading the rollers. The inner raceways pivot relatively parallel to the rollers axes and cause little additional roller radial compression resistance as compared to an inner race pivoting relatively perpendicular to the rollers axes. This will permit the bearing to be slightly self-aligning and accomodate a small degree of shaft slope through the bearing, without meeting great roller resistance to the pivoting, and without overstressing the rollers.

Figure 5:
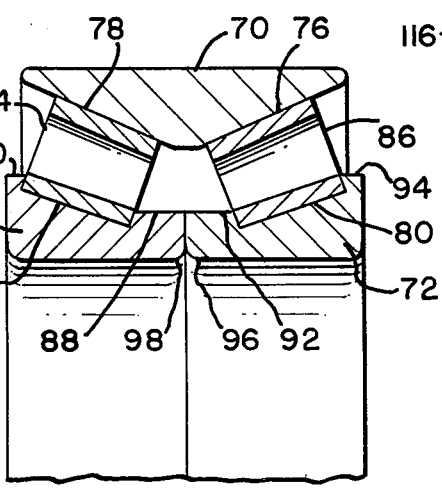
FIG. 5 is a sectional view of a bearing embodiment including two sets of tapered hollow rollers to provide roller aligning forces widely spaced on means such as a shaft or spindle of a machine tool.

The tapered hollow roller tapered bearing of FIG. 5 shows a bearing constructed to cause the two cenerlines of roller pressures perpendicular to the raceways to cross the bearing centerline at widely separated points to provide rigidity to a spindle shaft for the purpose of resisting shaft sloping and provide a truer running spindle as is desirable in all machine tools. The inner raceways tend to pivot relatively perpendicular to the rollers than parallel to them, and thus encounter great roller resistance to the pivoting.

The bearing includes an outer raceway means consisting of a race 70 and an inner raceway means consisting of two races 72 and 74. Race means 70 could alternatively be constructed of two races back to back. Raceways 76 and 78 on outer race 70 are in confronting relationship with raceway 80 and 82, respectively, on inner races 72 and 74, respectively. The raceways define annular spaces in which are located a first set of tapered hollow rollers 84 and a second set of tapered hollow rollers 86. End flanges 88 and 90 on race 74 axially locate rollers 84 on the raceway 82. End flange 92 and 94 on race 72 axially locate the rollers 86 along raceway 80. Large diameter end flanges 90 and 94 help to guide the rollers.

The tapered hollow rollers preferably are in preloaded contact with the raceways. The tapered raceways 76 and 80 tend to converge axially inward of the bearing and the tapered raceways 78 and 82 tend to converge axially inward in the opposite axial direction.

This structure also incorporates the possibility of varying the preload, which is accomplished by grinding one or both of the mating faces 96 and 98 of the inner races a calculated amount as required to move the inner races toward each other the proper distance to preload or compress the rollers the required amount as determined by the load, speed, and other requirements of the bearing application. The inner races may thereafter be welded or otherwise bonded or attached together if desired, to maintain the preload. They may also merely be contained in position by machine elements.

Figure 6:
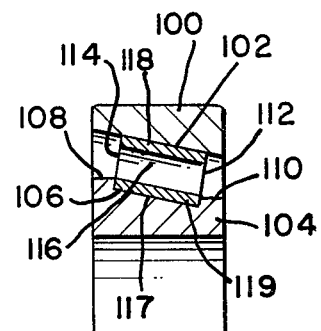
FIG. 6 is a sectional elevational view of a tapered bearing including preloaded cylindrical hollow rollers.

FIG. 6 shows a tapered bearing with cylindrical hollow rollers and includes an outer member 100 having an inner tapered raceway 102 and an inner member 104 having an outer tapered raceway 106. A pair of end flanges 108 and 110 on the ends of inner member 104 axially position the cylindrical hollow rollers 112. These flanges may alternatively be formed on the outer member. Either or each flange 108 and 110 may help to guide the rollers.

The raceways 102 and 106 confront one another to define an annular space 114. A plurality of the cylindrical hollow rollers 112 are located in the annular space 114. The cylindrical hollow rollers are stiffly flexible hollow rollers and may have a percent hollowness in the range of 50 percent to 80 percent. The preferred hollowness is in the range from 55 percent to 65 percent for good load-carrying capacity but with sufficient resilience. The outside diameter of the cylindrical hollow rollers 112 may be slightly greater than the spacing between the raceways 102 and 106 so that when the cylindrical hollow rollers are assembled in the bearing they will be compressed to a slightly oval cross-sectional shape and be located in the bearing in preloaded contact with the raceways 102 and 106. All of the cylindrical hollow rollers 112 are always in contact with the raceways 102 and 106.

The rollers 112 are cylindrical hollow rollers with a bore 116 formed by the inner surface 118 of annular wall 119 extending entirely through the roller. The confronting raceways 102 and 106 in preloaded contact with the outer surface 117 of the wall 119 are parallel to one another. No cage is required to separate and guide the cylindrical rollers 112. The rollers are straight, not tapered, which results in considerable savings in manufacture of this particular embodiment of bearing. The rollers can be ground by regular high production through feed grinders which will result in lower costs than in the manufacture of a conventional tapered roller bearing. Since the raceways 102 and 106 are ground to the same angle, the expensive matching of different angles required by conventional tapered roller bearing structures is eliminated.

Any desired preload of the stiffly flexible cylindrical rollers 112 is carefully controlled by controlling the axial position of one of the members 100 with respect to the other member 104. Thus, a variable preload can be provided. While it is also possible to preload a conventional solid roller tapered bearing in like manner, the use of the flexible hollow rollers 112 provides a much greater degree of preloading control. The amount of conventional bearing preload is extremely sensitive to the relative axial location of the races and a slightly excessive moving together of the races can rapidly result in extremely excessive peak loads on a few rollers which causes rapid wear of the bearing. However, with this same race location, the hollow rollers 112 will flex slightly, preventing the buildup of excessive stresses in the bearing and thus allowing greater tolerance in the location of one race relative to the other. A desired preload can be designed in and provided reasonably closely without its value being changed radically by a slight off-location relationship of the races. Since the axial positioning of one race toward, or away from the other is easily measured, the radial compression of the hollow rollers is easily controlled and is a straight-line relationship to the race movement. Thus, a greater or lesser preload, or no preload at all, may be furnished as desired for each particular bearing application. The races may be maintained in their preloading positions by machine elements.

Of course, the cylindrical roller tapered bearings shown in FIG. 6 might be used in structures similar to that shown in FIG. 4 and in structures similar to that shown in FIG. 5. To make the change, cylindrical hollow rollers would be substituted for the tapered rollers in FIG. 4 or FIG. 5 and the raceways which are contacted by the tapered hollow rollers in preloaded contact would be changed from a non-parallel converging arrangement to a parallel arrangement.

I claim:

1. A tapered bearing comprising: inner and outer members having inner and outer tapered raceways confronting one another to define an annular space; and a plurality of hollow rollers located in said annular space, each hollow roller having an axial bore extending completely therethrough, the ratio of the diameter of the axial bore to the outside diameter of each hollow roller being uniform for its full length.

2. A tapered bearing in accordance with claim 1 wherein each hollow roller is a cylindrical roller in preloaded contact with the raceways, the wall thickness of the roller is constant throughout its length, and the tapered raceways are parallel.

3. A tapered bearing in accordance with claim 1 wherein each hollow roller has a sloping outer surface, and the surface of the axial bore is also a sloping surface.

4. A tapered bearing in accordance with claim 3 wherein each hollow roller is in preloaded contact with the raceways.

5. A tapered bearing comprising: inner and outer raceway means, each having two raceways thereby providing two inner and two outer raceways confronting one another to define an annular space, one of said raceway means including a pair of races, the raceways of one of said pair of races sloping in the opposite direction to the slope of the raceways of the other of said pair of races; the other raceway means being a single race; two sets of hollow rollers located in said annular space, each hollow roller having a ratio of diameter of the axial bore to the outside diameter which is uniform for its full length.

6. A tapered bearing in accordance with claim 5 wherein the rollers are cylindrical and the confronting raceways are parallel in longitudinal direction with the cylindrical rollers in preloaded contact with said raceway means.

7. A tapered bearing in accordance with claim 5 wherein each hollow roller has a sloping outer surface, and the surface of the axial bore is also a sloping surface.

8. A tapered bearing in accordance with claim 7 wherein each hollow roller is in preloaded contact with said raceway means.

9. A tapered hollow roller comprising: an annular wall with an outer surface which slopes at a first predetermined angle with respect to the roller axis and an inner surface which slopes at a second predetermined angle with respect to the roller axis different from the slope of the outer surface, the slopes being such that the annular wall has uniformly varying thickness from one end to the other and the ratio of the diameter of the axial bore to the outside diameter of the roller is uniform for the full length of the roller.

10. A tapered hollow roller in accordance with claim 9 wherein the percent hollowness lies in the range from 50 percent to 80 percent.

11. A tapered hollow roller in accordance with claim 9 wherein the percent hollowness lies in the range from 55 percent to 65 percent.

* * * * *